United States Patent
Hsieh

(10) Patent No.: US 10,505,441 B2
(45) Date of Patent: Dec. 10, 2019

(54) VOLTAGE REGULATION SYSTEM, REGULATOR CHIP AND VOLTAGE REGULATION CONTROL METHOD

(71) Applicant: NUVOTON TECHNOLOGY CORPORATION, Hsinchu (TW)

(72) Inventor: Chung-Ming Hsieh, Hsinchu (TW)

(73) Assignee: Nuvoton Technology Corporation, Hsinchu (TW)

( * ) Notice: Subject to any disclaimer, the term of this patent is extended or adjusted under 35 U.S.C. 154(b) by 0 days.

(21) Appl. No.: 16/179,612

(22) Filed: Nov. 2, 2018

(65) Prior Publication Data
US 2019/0267897 A1    Aug. 29, 2019

(30) Foreign Application Priority Data

Feb. 26, 2018  (TW) .............................. 107106433 A

(51) Int. Cl.
*H02M 1/36* (2007.01)
*H02M 3/158* (2006.01)
*H02M 1/00* (2006.01)

(52) U.S. Cl.
CPC ............. *H02M 1/36* (2013.01); *H02M 3/158* (2013.01); *H02M 3/1588* (2013.01); *H02M 2001/009* (2013.01); *H02M 2001/0045* (2013.01)

(58) Field of Classification Search
CPC ... H02M 2001/0045; H02M 2001/009; H02M 1/36; H02M 3/156; H02M 3/158; G05F 1/56
See application file for complete search history.

(56) References Cited

U.S. PATENT DOCUMENTS

| | | | | |
|---|---|---|---|---|
| 9,898,021 B2* | 2/2018 | Hsieh | .......................... | G05F 1/56 |
| 2009/0309559 A1* | 12/2009 | Xia | ............................ | G05F 1/56 323/265 |
| 2012/0161732 A1* | 6/2012 | Renton | .................. | H02M 3/156 323/275 |
| 2013/0021012 A1* | 1/2013 | Oddoart | ................ | H02M 3/156 323/282 |

(Continued)

FOREIGN PATENT DOCUMENTS

WO    WO-2018115869 A1 *   6/2018   ............ H02M 3/156

*Primary Examiner* — Fred E Finch, III
(74) *Attorney, Agent, or Firm* — Muncy, Geissler, Olds & Lowe, P.C.

(57) ABSTRACT

A voltage regulation system, a regulator chip and a voltage regulation control method thereof are provided. The voltage regulation control method includes the steps of disabling a first regulator, and electrically connecting an input terminal of a second regulator to a power supply terminal; setting a voltage on a second terminal of a first transistor of the first regulator to a ground voltage for a predetermined period; next, turning off the first transistor and the second transistor of the first regulator; next, activating the second regulator, and detecting the voltage on the second terminal of the first transistor; when the voltage on the second terminal of the first transistor is equal to the voltage on the power supply terminal, determining that an inductor electrically connected between the first regulator and the second regulator; otherwise, determining that first regulator and the second regulator are not electrically connected to each other.

10 Claims, 7 Drawing Sheets

(56) References Cited

U.S. PATENT DOCUMENTS

| | | | | |
|---|---|---|---|---|
| 2014/0111169 A1* | 4/2014 | Polarouthu | ............ | H02M 3/156 323/271 |
| 2016/0172973 A1* | 6/2016 | Rince | .................... | H02M 3/158 323/271 |
| 2016/0190926 A1* | 6/2016 | Ni | ............................. | G05F 1/56 323/271 |
| 2016/0261184 A1* | 9/2016 | Chen | ................... | H02M 3/1584 |
| 2017/0147020 A1* | 5/2017 | Turkewadikar | ............ | G05F 1/56 |
| 2017/0160756 A1* | 6/2017 | Hsieh | ........................ | G05F 1/56 |

* cited by examiner

VOLTAGE REGULATION SYSTEM, REGULATOR CHIP AND VOLTAGE REGULATION CONTROL METHOD

CROSS-REFERENCE TO RELATED APPLICATION

This application claims the benefit of Taiwan Patent Application No. 107106433 filed on Feb. 26, 2018 in the Taiwan Intellectual Property Office, the disclosure of which is incorporated herein in its entirety by reference.

BACKGROUND OF THE INVENTION

1. Field of the Invention

The present invention relates to a voltage regulation technology, more particularly to a voltage regulation system capable of electrically connecting different types of regulators in series and detecting an external inductor.

2. Description of the Related Art

In recent years, in order to meet the requirements of low static power, a DC/DC regulator is used in MCU or other similar SOCs, and embedded systems, to replace conventional linear regulator.

The DC/DC regulator is more efficient than the linear regulator. For example, the DC/DC regulator can have a switching efficiency of more than 80% under the operating condition of an input voltage of 3.3V and an output voltage of 1.2V, but the linear regulator can have a maximum efficiency of only 36% under the same operating condition. However, the difference between the efficiencies of these two types of regulators are more than 44%.

The DC/DC regulator has a significant advantage of high efficiency, but it also has some problems. The characteristics of the DC/DC regulator is to use the power component as a switch, so that a switch signal, rising from zero to a power level, may occur at a node in the circuit and a larger current may be output from this node. Such a rapid switching of the voltage level at this node may cause significant bouncing or may interfere (such as EMI/EMC) with the operation of other circuits.

Some MCUs have DC/DC regulators and the linear regulators integrated on the same chip, so that the user can decide which regulator to use. However, with this design, the system of the MCU may not know whether an external circuit (such as an inductor) is connected to the MCU to activate the DC/DC regulator or the linear regulator.

SUMMARY OF THE INVENTION

In order to solve conventional problems, the present invention is to provide a voltage regulation system, a regulator chip and a voltage regulation control method.

According to one embodiment, the present invention provides a voltage regulation control method. This method is applicable to a voltage regulation system which comprises a first regulator and a second regulator. The first regulator comprises a first transistor and a second transistor. The first transistor comprises a first terminal electrically connected to a power supply terminal, and a second terminal electrically connected to a first terminal of the second transistor, and, a second terminal of the second transistor is grounded. The second regulator comprises an input terminal and an output terminal, and the output terminal of the second regulator is the output terminal of the voltage regulation system. The voltage regulation control method comprises steps of disabling the first regulator, electrically connecting the input terminal of the second regulator to a power supply terminal; within a predetermined period, setting a voltage on the second terminal of the first transistor to a ground voltage; setting the first transistor and the second transistor to the turn-off state; activating the second regulator, and then detecting a voltage on the second terminal of the first transistor; determining that an inductor component is electrically connected between the second terminal of the first transistor and the input terminal of the second regulator, when the voltage on the second terminal of the first transistor is equal to the voltage on the power supply terminal; and, determining that open-circuit is formed between the second terminal of the first transistor and the input terminal of the second regulator, when the voltage on the second terminal of the first transistor is equal to the ground voltage.

Preferably, after the step of determining that an open-circuit has been formed between the second terminal of the first transistor and the input terminal of the second regulator, the voltage regulation control method further comprises a step of disabling the first regulator, and only enabling the second regulator for operation of the voltage regulation system.

Preferably, after the step of determining that an inductor component is electrically connected between the second terminal of the first transistor and the input terminal of the second regulator, the voltage regulation method further comprises a step of enabling the first regulator and the second regulator for operation of the voltage regulation system, wherein the output voltage of the first regulator serves as the input voltage of the second regulator.

According to one embodiment, the present invention provides a voltage regulation system comprising a first regulator, a second regulator, a start-up and logic control circuit and a comparator. The first regulator comprises a first transistor and a second transistor, and the first transistor comprises a first terminal electrically connected to a power supply terminal, and a second terminal electrically connected to a first terminal of the second transistor. A second terminal of the second transistor is grounded. The second regulator comprises an input terminal and an output terminal, the output terminal of the second regulator is the output terminal of the voltage regulation system. The start-up and logic control circuit has a detection mode. In the detection mode, the start-up and logic control circuit first disables the first regulator, and electrically connects the input terminal of the second regulator to a power supply terminal, and sets a voltage on the second terminal of the first transistor to the ground voltage within a predetermined period, and then sets the first transistor and the second transistor set to the turn-off state, and then activates the second regulator, and detects the voltage on the second terminal of the first transistor. According to the voltage on the second terminal of the first transistor, the comparator can determine whether an inductor component is electrically connected between the second terminal of the first transistor and the input terminal of the second regulator.

Preferably, when the comparator determines that no inductor component is electrically connected between the second terminal of the first transistor and the input terminal of the second regulator, the start-up and logic control circuit first disables the first regulator, and only enables the second regulator for operation of the voltage regulation system.

Preferably, when the comparator determines that the inductor component is electrically connected between the second terminal of the first transistor and the input terminal of the second regulator, the start-up and logic control circuit enables the first regulator and the second regulator for operation of the voltage regulation system, and the output voltage of the first regulator serves as the input voltage of the second regulator.

Preferably, the first regulator is a single inductor and multiple output (SIMO) regulator.

Preferably, the voltage regulation system comprises multiple second regulators.

Preferably, the voltage regulation system can comprise a switch controller, a plurality of first switches and a plurality of second switches. The plurality of first switches are electrically connected between input terminals of the plurality of second regulators and the output terminal of the first regulator, respectively, and the plurality of second switches are electrically connected between the input terminals of the plurality of second regulators and the power supply terminal, respectively. The switch controller is configured to turn on or off the plurality of first switches and the plurality of second switches, respectively.

According to an embodiment, the present invention provides a regulator chip comprising a first regulator, a second regulator, a start-up and logic control circuit and a comparator. The second regulator comprises an input terminal and an output terminal, the input terminal of the second regulator is electrically connected to a power supply terminal or to an output terminal of the first regulator through an external inductor component. The output terminal of the second regulator serves as the power output terminal of the regulator chip. The start-up and logic control circuit has a detection mode and an operation mode. In a detection mode, the start-up and logic control circuit first disables the first regulator, and electrically connects the input terminal of the second regulator to a power supply terminal, and then maintains the voltage on the output terminal of first regulator at a ground voltage within a predetermined period; next, the start-up and logic control circuit activates the second regulator. When the comparator detects that the voltage on the output terminal of the first regulator is equal to the voltage of on the power supply terminal, the comparator determines that the external inductor component is electrically connected between the second terminal of the first transistor and the input terminal of the second regulator, and in an operation mode, the start-up and logic control circuit uses the output voltage of the first regulator to provide the input voltage of the second regulator through the external inductor component. When the comparator detects that the voltage on the output terminal of the first regulator is not equal to the voltage on the power supply terminal, the comparator determines that an open-circuit has been formed between the second terminal of the first transistor and the input terminal of the second regulator, and in an operation mode, the start-up and logic control circuit uses the output voltage of the power supply terminal to provide the input voltage of the second regulator.

BRIEF DESCRIPTION OF THE DRAWINGS

The structure, operating principle and effects of the present invention will be described in detail by way of various embodiments which are illustrated in the accompanying drawings.

DETAILED DESCRIPTION OF THE PREFERRED EMBODIMENTS

Figure 1:
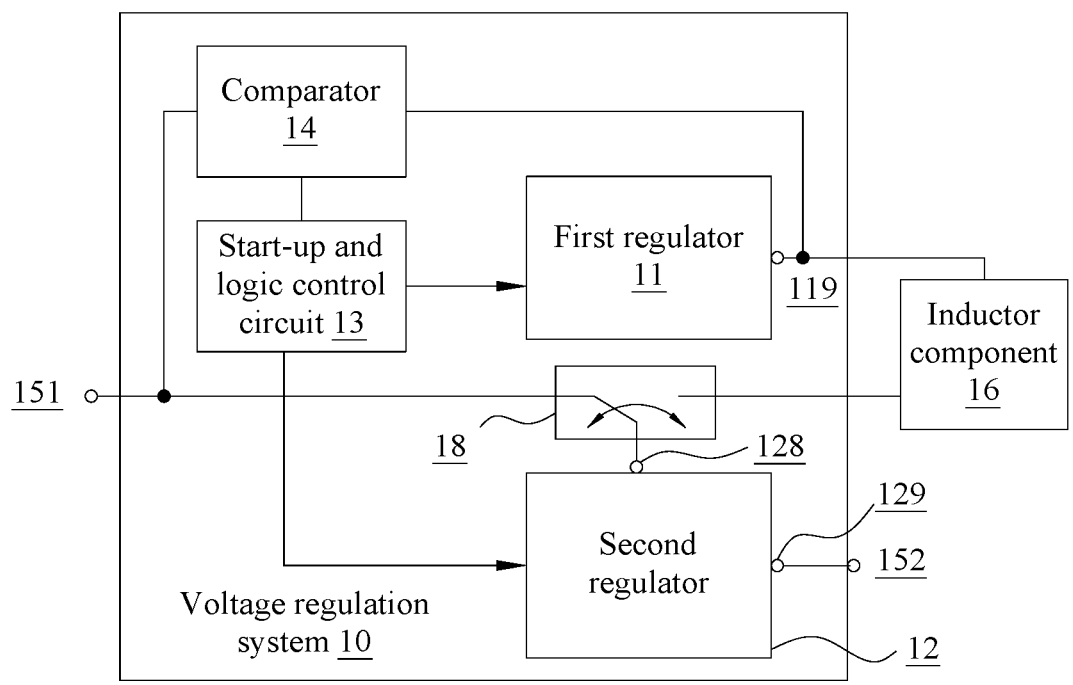
FIG. 1 is a block diagram of a voltage regulation system of an embodiment of the present invention.

The following embodiments of the present invention are herein described in detail with reference to the accompanying drawings. These drawings show specific examples of the embodiments of the present invention. It is to be understood that these embodiments are exemplary implementations and are not to be construed as limiting the scope of the present invention in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be understood that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be understood to imply the inclusion of stated elements but not the exclusion of any other elements.

Figure 2:
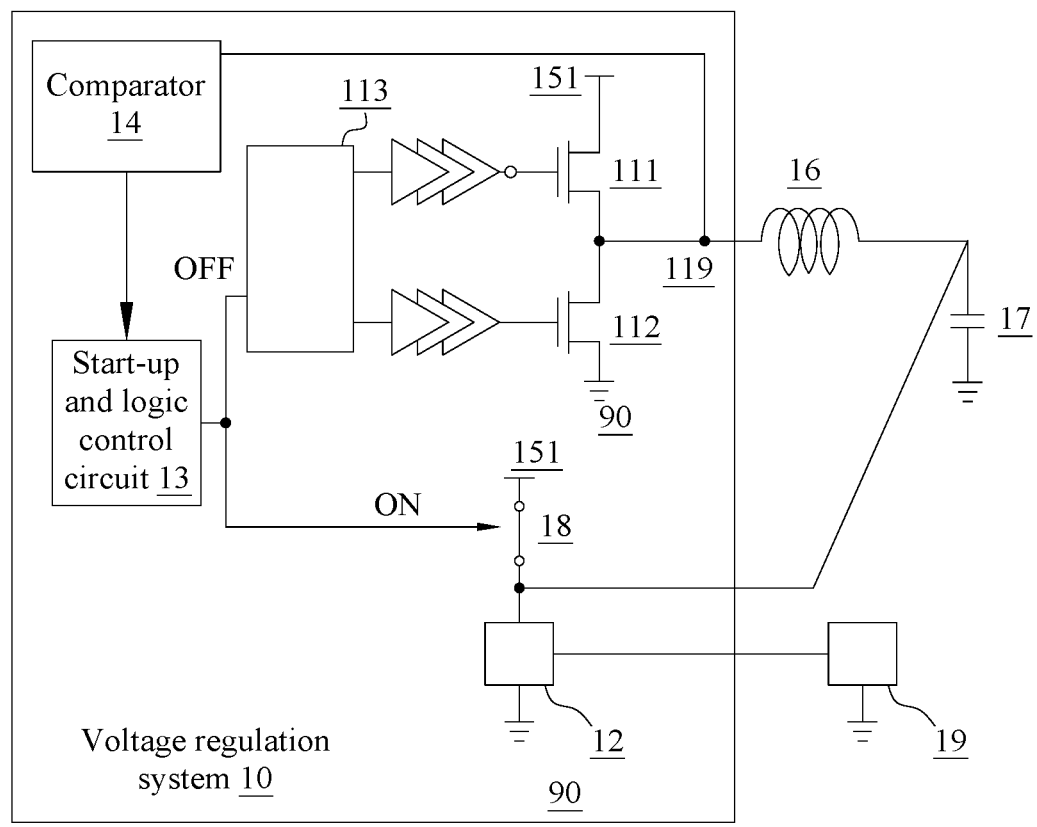
FIG. 2 is a schematic view of a voltage regulation system electrically connected to an inductor component, according to an embodiment of the present invention.
Figure 3:
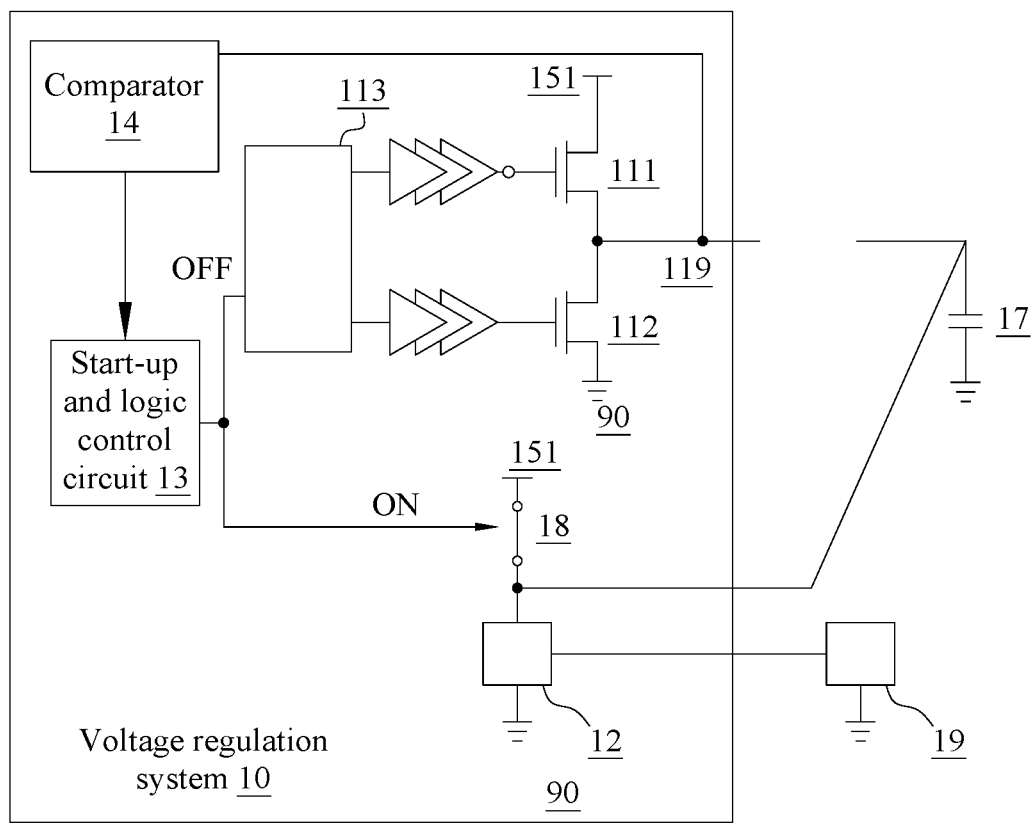
FIG. 3 is a schematic view of a voltage regulation system not electrically connected to an inductor component, according to an embodiment of the present invention.

Please refer to FIGS. 1 through 3, which respectively are a block diagram of a voltage regulation system, and schematic views of two statuses of the voltage regulation system, according to an embodiment of the present invention. As shown in FIG. 1, a voltage regulation system 10 comprises a first regulator 11, a second regulator 12, a start-up and logic control circuit 13, a switch 18, and a comparator 14. An output terminal 129 of the second regulator 12 serves as a power output terminal 152 of the voltage regulation system 10, that is, the output voltage of the second regulator 12 can serve as an output voltage of the voltage regulation system 10. Preferably, the first regulator 11 and the second regulator 12 can be different types of regulators; for example, the first regulator 11 can be a regulator having higher output efficiency and more noise; preferably, the first regulator 11 can be a buck regulator or a switch regulator. The second regulator 12 can be a regulator having lower output efficiency and less noise; preferably, the second regulator 12 can be a linear regulator.

The first regulator 11 can be electrically connected to the second regulator 12 in series through an inductor component 16; that is, the output voltage of the first regulator 11 can provide the input voltage of the second regulator 12; furthermore, the second regulator 12 can independently receive the voltage of the power supply terminal 151 for operation. The input terminal 128 of the second regulator 12 can be electrically connected to the switch 18, and the switch 18 can be controlled to determine whether the input terminal 128 is electrically connected to the power supply terminal 151. The following describes the operation of detecting the presence of the inductor component 16. In practical implementation, the second regulator 12 also electrically connects to a capacitor component 17 to diminish noise.

Please refer to FIG. 2. A buck regulator is taken as an example of the first regulator 11 for exemplary illustration. The first regulator 11 can comprise a first transistor 111, a second transistor 112, and a control logic circuit 113. The first transistor 111 comprises a first terminal electrically connected to a power supply terminal 151, and a second terminal electrically connected to a first terminal of the second transistor 112. A second terminal of the second transistor 112 is electrically connected to ground 90.

In this embodiment, the first transistor 111 can be a PMOS transistor, and the second transistor 112 can be a NMOS transistor. The PMOS transistor has a source electrically connected to the power supply terminal 151, a drain electrically connected to a drain of the NMOS transistor, and a gate coupled to the control logic circuit 113 through at least one buffer. The NMOS transistor has a source electrically connected to ground 90 and a gate electrically connected to the control logic circuit 113 through at least one buffer. The control logic circuit 113 is configured to turn on or off the first transistor 111 and the second transistor 112. Preferably, the control logic circuit 113 can be a PWM control circuit or a PFM control circuit. The buck regulator is well known to persons skilled in the art, so the detailed description is not repeated.

In this embodiment, a linear regulator is taken as an example of the second regulator 12 for exemplary illustration. The second regulator 12 comprises an input terminal 128 and an output terminal 129. The output terminal 129 of the second regulator 12 serves as the power output terminal 152 of the voltage regulation system 10 and configured to provide an output voltage to the load component 19. When the voltage regulation system 10 is powered on, the start-up and logic control circuit 13 is operated in a detection mode first, to detect the presence of the inductor component 16, and then determines the operations of the first regulator 11 and the second regulator 12 according to a detection result.

In the detection mode, the start-up and logic control circuit 13 first disables the first regulator 11, and electrically connects the input terminal 128 of the second regulator 12 to the power supply terminal 151. Next, the start-up and logic control circuit sets (or maintains) the voltage on the second terminal of the first transistor 111 to a ground voltage within a predetermined period. In actual application, the start-up and logic control circuit 13 can turn off the first transistor 111 and turn on the second transistor 112 by using the control logic circuit 113, so as to set or maintain the voltage on the second terminal of the first transistor 111 to the ground voltage. In other embodiments, the second terminal can be grounded through another switch, and after the start-up and logic control circuit 13 turns on the switch, the voltage on the second terminal of the first transistor 111 can be set to the ground voltage. In an embodiment, the second terminal of the first transistor 111 directly serves as the output terminal 119 of the first regulator 11, or, is coupled to the output terminal 119 of the first regulator 11; in this embodiment, the second terminal of the first transistor 111 and the output terminal 119 of the first regulator 11 can be regarded as the same terminal; however, the present invention is not limited thereto.

Next, the first transistor 111 and the second transistor 112 are set to the turn-off state, the purpose of this operation is to prevent the voltage on the output terminal of the first regulator 11 from being affected by the first regulator 11. Furthermore, in other embodiments, when the second terminal is grounded through the other switch, the switch also must be turned off. Next, the start-up and logic control circuit 13 activates the second regulator 12; for example, the start-up and logic control circuit 13 can turn on the switch 18 to provide the voltage of the power supply terminal as the input voltage of the second regulator 12. Next, according to the voltage on the output terminal 119 of the first regulator 11, the comparator 14 can determine whether the inductor component 16 is electrically connected between the output terminal 119 of the first regulator 11 and the input terminal 128 of the second regulator 12.

When no inductor component 16 is electrically connected between the output terminal 119 of the first regulator 11 and the input terminal 128 of the second regulator 12, it indicates that open-circuit is formed between the output terminal 119 of the first regulator 11 and the input terminal 128 of the second regulator 12, so the voltage on the output terminal 119 of the first regulator 11 does not affected by the second regulator 12 and is still maintained at the ground voltage, as shown in FIG. 3; on the other hand, when the inductor component 16 is electrically connected between the output terminal 119 of the first regulator 11 and the input terminal 128 of the second regulator 12, and the voltage on the input terminal becomes the voltage on the second regulator 12, the voltage on the output terminal 119 of the first regulator 11 can also be pulled up to the voltage on the power supply terminal 151, as shown in FIG. 2, so the comparator 14 can determine that the inductor component 16 is electrically connected between the output terminal 119 of the first regulator 11 and the input terminal 128 of the second regulator 12 when the voltage on the output terminal 119 of the first regulator 11 is changed or is higher than a preset voltage.

In an embodiment, the comparator 14 can determine whether the voltage on the output terminal 119 of the first regulator 11 is higher than a preset voltage. When the voltage on the output terminal 119 is higher than the preset voltage, the comparator 14 can determine the presence of the inductor component 16. When the voltage on the output terminal 119 is lower than the preset voltage, the comparator 14 can determine the absence of the inductor component 16. In other embodiments, the comparator 14 can determine whether the voltage on the output terminal 119 of the first regulator 11 is changed, and when the voltage is changed, the comparator 14 can determine the presence of the inductor component 16; and, when the voltage is not changed, the comparator 14 can determine the absence of the inductor component 16.

When the comparator 14 determines that no inductor component 16 is electrically connected between the second terminal of the first transistor 111 and the input terminal 128 of the second regulator 12, the start-up and logic control circuit 13 disables the first regulator 11 and only enables the second regulator 12 for operation of the voltage regulation system 10, and turn on the switch 18 to enable the second regulator 12 to receive the voltage on the power supply terminal 151 for operation. When the comparator 14 determines that the inductor component 16 is electrically connected between the second terminal of the first transistor 111 and the input terminal 128 of the second regulator 12, the start-up and logic control circuit 13 enables both of the first regulator 11 and the second regulator 12 for operation of the voltage regulation system 10, and the output voltage of the first regulator 11 is served as the input voltage of the second regulator 12.

When the load component 19 requires higher stability or low noise for the power source, it is unsuitable for activating and using the first regulator 11, so the user does not need to dispose the inductor component 16. After the voltage regulation system 10 is powered on, the voltage regulation system can automatically detect the absence of the inductor component 16, and only second regulator 12, which has higher stability or low noise, is activated to provide power to the load component 19. When the user needs a highly-efficient regulation system, the user can electrically connect the inductor component 16 between the second terminal of the first transistor 111 and the input terminal 128 of the second regulator 12, and after the voltage regulation system 10 is powered on, the voltage regulation system can automatically detect the presence of the inductor component 16, and then activate both of the first regulator 11 and the second regulator 12, and input the output voltage of the first regulator 11 into the second regulator 12, and the second regulator 12 provides power to the load component 19.

In other implementations, the first regulator 11 can be a single inductor and multiple output (SIMO) regulator; furthermore, the voltage regulation system can comprise multiple second regulators 12.

Figure 4:
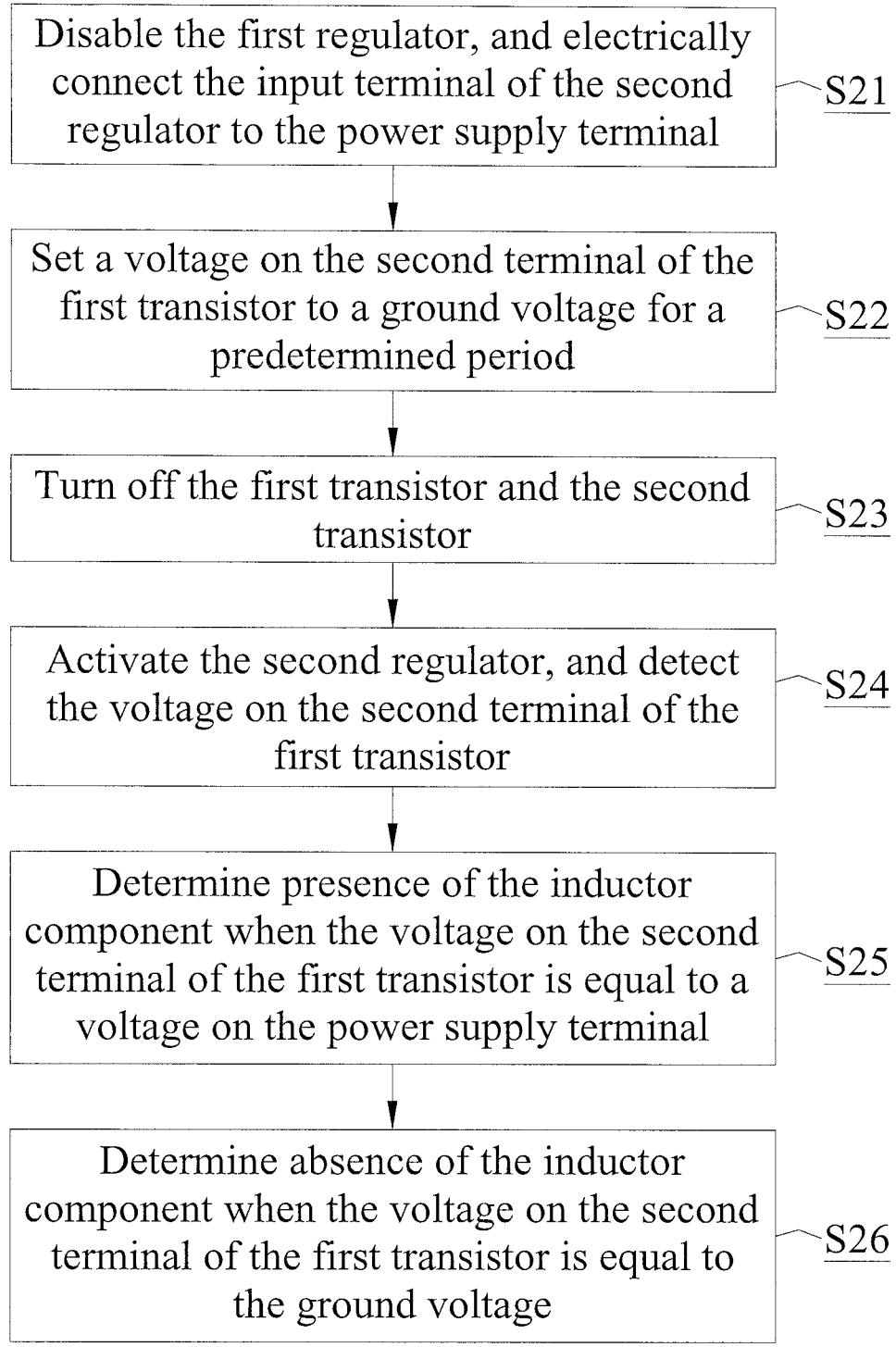
FIG. 4 is a flow chart of a voltage regulation control method of an embodiment of the present invention.

Please refer to FIG. 4, which is a flow chart of a voltage regulation control method of an embodiment of the present invention. The voltage regulation control method is applicable to a voltage regulation system, such as the voltage regulation system shown in FIGS. 1 through 3. The voltage regulation control method comprises steps S21 to S26.

In step S21, the first regulator is disabled, and the input terminal of the second regulator is electrically connected to the power supply terminal. In step S22, within a predetermined period, the voltage on the second terminal of the first transistor is set to and maintained at the ground voltage. As shown in FIG. 2, the start-up and logic control circuit 13 can set the first transistor 111 to the turn-off state and set the second transistor 112 to the turn-on status through the control logic circuit 113, so as to set the voltage on the second terminal of the first transistor 111 to the ground voltage; alternatively, in other embodiments, the second terminal can be grounded through the other switch, so the start-up and logic control circuit 13 turns on this switch to set the voltage on the second terminal of the first transistor 111 to the ground voltage.

In step S23, the first transistor and the second transistor are set to the turn-off state. In step S24, the second regulator is activated, and the voltage on the second terminal of the first transistor is detected. In step S25, after the second regulator is activated, when the voltage on the second terminal of the first transistor is equal to the voltage on the power supply terminal, it is determined that an inductor component is electrically connected between the second terminal of the first transistor and the input terminal of the second regulator. In step S26, when the voltage on the second terminal of the first transistor 111 is equal to the ground voltage, it is determined that an open-circuit is formed between the second terminal of the first transistor and the input terminal of the second regulator.

In an embodiment, after the step of determining that open-circuit is formed between the second terminal of the first transistor and the input terminal of the second regulator, the voltage regulation control method can comprise a step of disabling the first regulator, and only enabling the second regulator for operation of the voltage regulation system.

In an embodiment, after it is determined that an inductor component is electrically connected between the second terminal of the first transistor and the input terminal of the second regulator, the voltage regulation method can comprise a step of enabling both of the first regulator and the second regulator for the operation of the voltage regulation system, and use the output voltage of the first regulator as the input voltage of the second regulator.

In an embodiment, the voltage regulation system can be implemented by a regulator chip, that is, the regulator chip can comprise the first regulator 11, the second regulator 12, the start-up and logic control circuit 13, the comparator 14, and the switch 18; and, the inductor component 16 is disposed outside the regulator chip, and the regulator chip comprises a plurality of pins including the power supply terminal 151 and the power output terminal 152, and two of the pins are electrically connected to two terminals of the inductor component 16.

The second regulator 12 comprises the input terminal 128 and the output terminal 129, the input terminal 128 of the second regulator 12 can be electrically connected to the power supply terminal 151, or to the output terminal 119 of the first regulator 11 through the external inductor component 16, selectively. The output terminal 129 of the second regulator 12 is the power output terminal 152 of the regulator chip. In the detection mode, the start-up and logic control circuit 13 disables the first regulator 11, and then electrically connects the input terminal 128 of the second regulator 12 to a power supply terminal 151. Next, within a predetermined period, the start-up and logic control circuit 13 maintains the voltage on the output terminal 119 of the first regulator 11 at the ground voltage; next, start-up and logic control circuit 13 activates the second regulator 12.

After the second regulator 12 is activated, when the comparator 14 detects that the voltage on the output terminal 119 of the first regulator 11 is equal to the voltage of on the power supply terminal 151, the comparator 14 determines that the external inductor component is electrically connected between the second terminal of the first transistor 111 and the input terminal 128 of the second regulator 12, and in the operation mode, the start-up and logic control circuit 13 provides the output voltage of the first regulator 11 to be the input voltage of the second regulator 12 through the external inductor component 16.

When the voltage on the output terminal 119 of the first regulator 11 detected by the comparator 14 is not equal to the voltage on the power supply terminal 15, for example, the voltage on the output terminal 119 is equal to the ground voltage, the comparator 14 can determine that an open-circuit is formed between the second terminal of the first transistor 111 and the input terminal 128 of the second regulator 12, and in the operation mode, the start-up and logic control circuit 13 provides the output voltage of the power supply terminal 151 to be the input voltage of the second regulator 12.

Figure 5:
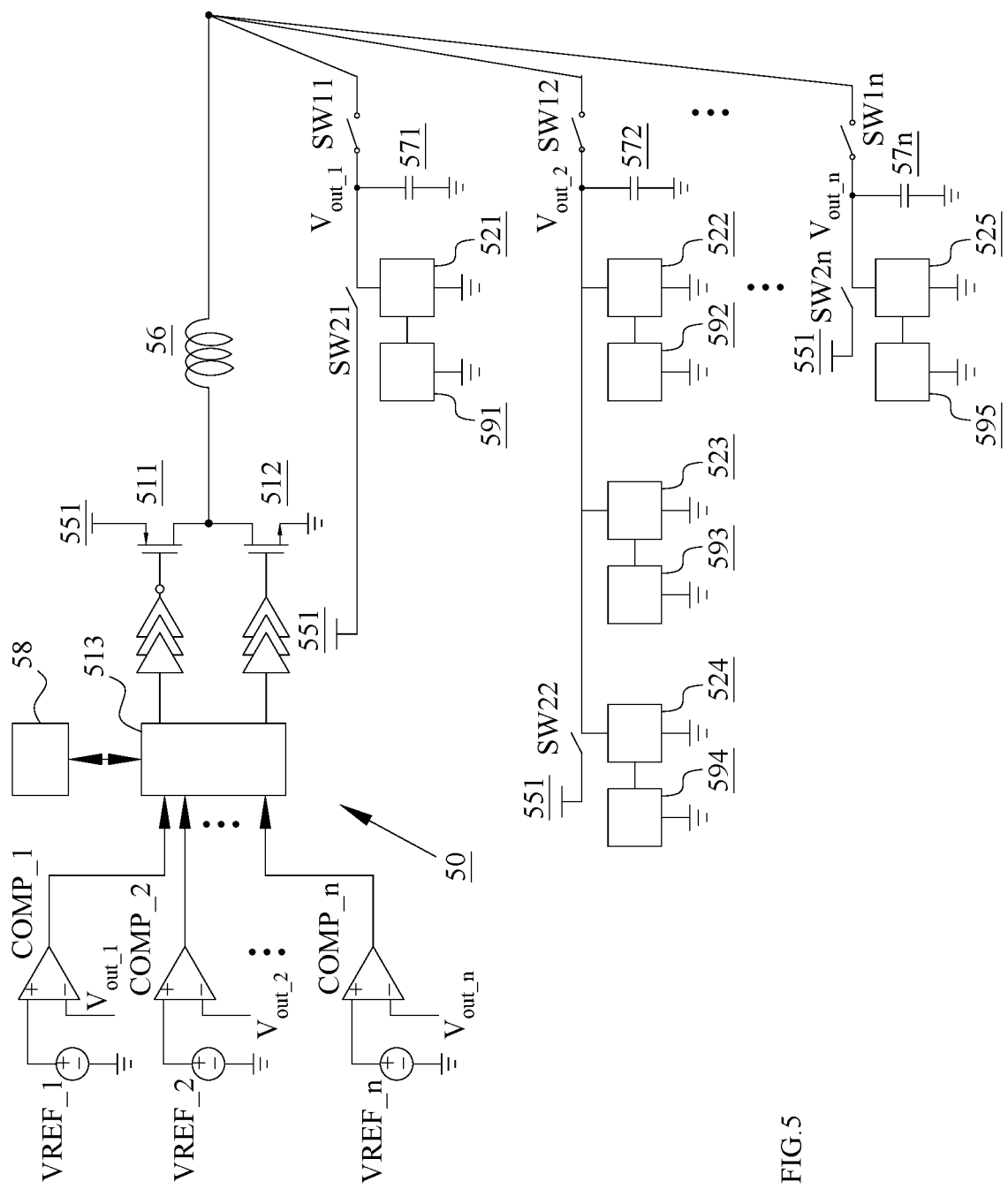
FIG. 5 is a schematic view of a voltage regulation system of another embodiment of the present invention.

Please refer to FIG. 5, which is a schematic view of a voltage regulation system of another embodiment of the present invention. In this embodiment, the voltage regulation system comprises a SIMO regulator 50, a plurality of second regulators 521~525, a plurality of switches SW11~SW1n and SW21~SW2n, and a plurality of capacitor components 571~57n, a switch controller 58, and an inductor component 56. The second regulators 521~525 electrically connect to the load components 592~595 respectively.

The SIMO regulator 50 comprises a plurality of reference voltages VREF_1~VREF_n, a plurality of comparators COMP_1~COMP_n, a control logic circuit 513, a first transistor 511 and a second transistor 512. In this embodiment, the first transistor 511 is implemented by a P-type transistor, and the second transistor 512 is implemented by a N-type transistor, and the gates of the first transistor 511 and the second transistor 512 are coupled to the control logic circuit 513 through buffer components, and the drains of the first transistor 511 and the second transistor 512 are electrically connected to a terminal of the inductor component 56, and the sources of the first transistor 511 and the second transistor 512 are electrically connected to the power supply terminal 551 and ground, respectively.

Other terminal of the inductor component 56 is electrically connected to terminals of the capacitor components 571~57n, and other terminals of the plurality of switches SW11~SW1n are electrically connected to terminals of the capacitor components 571~57n, respectively, and also electrically connected to input terminals of the plurality of second regulators 521~525, respectively. For example, the switch SW11 comprises a terminal electrically connected to other terminal of the inductor component 56, and another terminal electrically connected to a terminal of the capacitor component 571 and the input terminal of the second regulator 521; similarly, the switch SW12 comprises a terminal electrically connected to other terminal of the inductor component 56, and another terminal electrically connected to other terminal of the capacitor component 572 and the input terminals of the second regulators 522, 523 and 524, and so forth. It should be noted that the arrangement of aforementioned components is merely for exemplary illustration, and the present invention is not limited thereto, and the user can change the arrangement of the components upon practical demand. For example, other terminal of the switch SW11 can be electrically connected to four second regulators.

The voltages on the terminals of the capacitor components 571~57n electrically connected to the second regulators 521~525 are voltages Vout_1~Vout_n, respectively, and the other terminals of the capacitor components 571~57n are grounded. The voltages Vout_1~Vout_n are fedback and inputted to the comparators COMP_1~COMP_n, respectively. The comparators COMP_1~COMP_n compare the voltages Vout_1~Vout_n with the reference voltages VREF_1~VREF_n, respectively, to generate and output comparison results to the control logic circuit 513. The control logic circuit 513 controls the first transistor 511 and the second transistor 512 according to the comparison results.

The SIMO regulator 50 can output a plurality of different voltages, and control the different voltages according to the reference voltages VREF_1~VREF_n. For example, if the second regulator is designed to use the voltage Vout_1, outputted by the SIMO regulator 50, as the input voltage thereof, the second regulator can be connected to the switch SW11; if the second regulator is designed to use the voltage Vout_2, outputted by the SIMO regulator 50, as the input voltage thereof, the second regulator can be connected to the switch SW12, and so forth. It should be noted that, aforementioned content is merely for exemplary illustration, and the second regulator electrically connected to the switch SW11 is not limited to use the voltage Vout_1, outputted by the SIMO regulator 50, as the input voltage thereof. Furthermore, the SIMO regulator is well known to persons skilled in the art, so the detailed description is not repeated.

The switch controller 58 is configured to control the switches SW11~SW1n and the switches SW21~SW2n. Upon practical demand, the user can control the switch controller 58 to determine whether the input voltages of the second regulator 521~525 are provided by the voltage on the power supply terminal 551 or the output voltage of the SIMO regulator 50.

Figure 6:
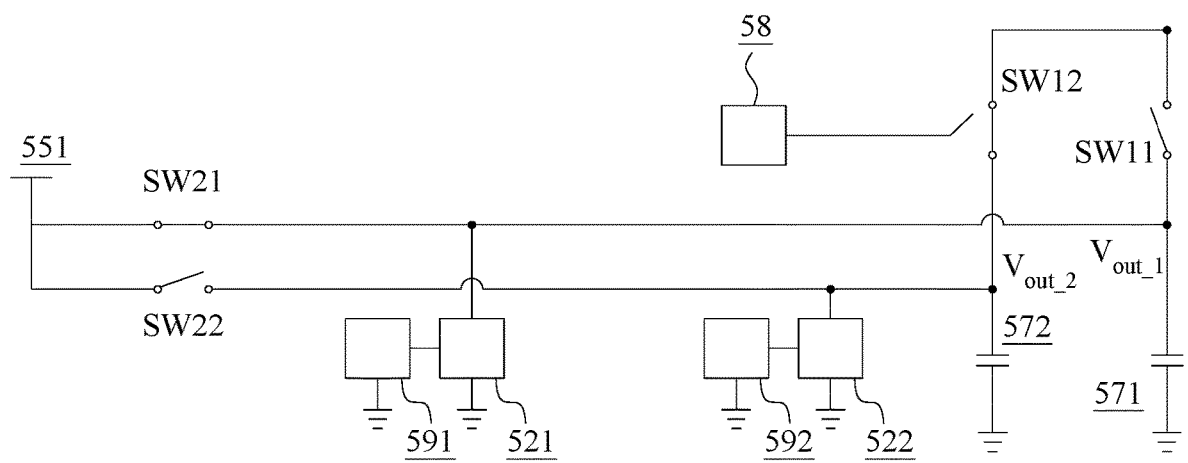
FIG. 6 is a schematic view of an operational state of the voltage regulation system of another embodiment of the present invention.

As shown in FIG. 6, if the load component 591 is sensitive to noise, the switch controller 58 can turn off the switch SW11 and turn on the switch SW21, and the voltage on the power supply terminal 551 serves as the input voltage of second regulator 521; if the load components 592~594 are not sensitive to noise, the switch controller 58 can turn on the switch SW12 and turn off the switch SW22, so that the output voltage Vout_2 of the SIMO regulator 50 is served as the input voltages of the second regulators 522~524.

Figure 7:
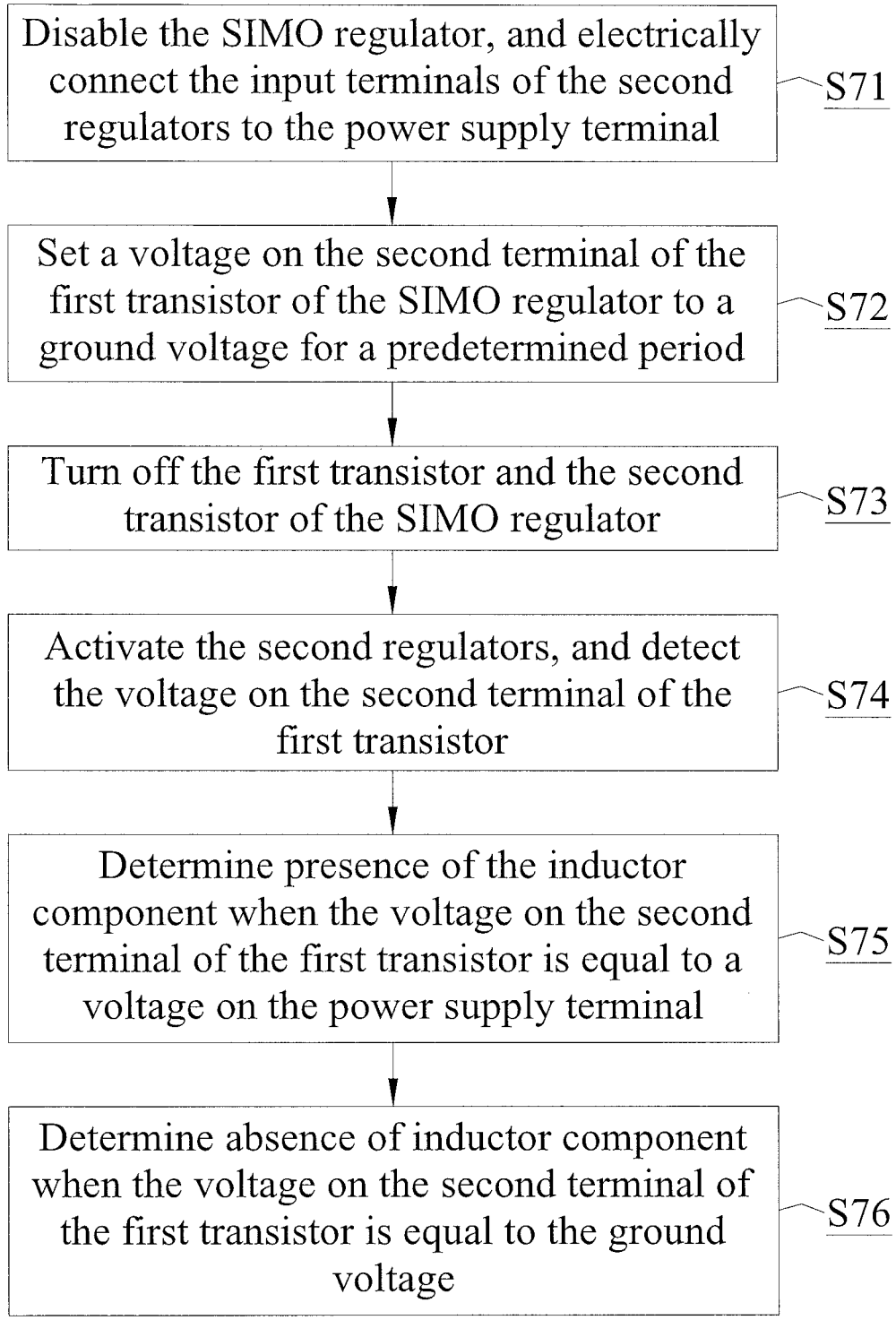
FIG. 7 is a flow chart of a voltage regulation control method of an embodiment of the invention.

Please refer to FIG. 7, which shows a flow chart of a voltage regulation control method of another embodiment of the present invention. This voltage regulation control method is applicable to a voltage regulation system using the SIMO regulator, such as the voltage regulation system shown in FIGS. 5 and 6. The voltage regulation control method is comprising steps S71 to S76.

In step S71, the SIMO regulator 50 is disabled, and the input terminals of the second regulators 521~525 are electrically connected to the power supply terminal; for example, the switch SW21~SW2n are turned on and the switches SW11~SW1n are turned off. In step S72, within a predetermined period, the voltage on the second terminal of the first transistor 511 is set to and maintained at ground voltage. For example, the control logic circuit 513 can set the first transistor 511 as the turn-off state, and set the second transistor 512 as the turn-on status, so that the voltage on the second terminal of the first transistor 511 can be set as the ground voltage; alternatively, in other implementations, the second terminal can be grounded through other switch, and when the switch is turned on, the voltage on the second terminal of the first transistor 511 can be set to the ground voltage.

In step S73, the first transistor 511 and the second transistor 512 are set to the turn-off state. In step S74, the second regulators 521~525 are activated, the switches SW11~SW1n are turned on, the voltage on the second terminal of the first transistor 511 are detected. In step S75, after the second regulators 521~525 are activated, when the voltage on the second terminal of the first transistor 511 is equal to the voltage on the power supply terminal 551, it is determined that the inductor component is electrically connected between the second terminal of the first transistor 511 and the input terminals of the second regulators 521~525. In step S76, when the voltage on the second terminal of the first transistor 511 is equal to the ground voltage, it is determined that open-circuit is formed between the second terminal of the first transistor 511 and the input terminals of the second regulators 521~525.

After it is determined that open-circuit is formed between the second terminal of the first transistor 511 and the input terminals of the second regulators 521~525, the voltage regulation control method can comprise a step of disabling the SIMO regulator 50, and only enables the second regulators 521~525 for operation of the voltage regulation system. It indicates that only voltage on power supply terminal 551 is provided to be the input voltages of the second regulators 521~525.

After it is determined that the inductor component is electrically connected between the second terminal of the first transistor 511 and the input terminals of the second regulators 521~525, the voltage regulation control method can comprise a step of enabling the SIMO regulator 50 and the second regulator 521~525 for operation of the voltage regulation system. It indicates that the output voltage of the SIMO regulator 50 can be provided to be the input voltages of the second regulators 521~525, as shown in FIG. 6.

The present invention provided herein has been described by means of specific embodiments. However, numerous modifications, variations and enhancements can be made thereto by those skilled in the art without departing from the spirit and scope of the disclosure set forth in the claims.

What is claimed is:

1. A voltage regulation control method applicable to a voltage regulation system, wherein the voltage regulation system comprises a first regulator and a second regulator, and the first regulator comprises a first transistor and a second transistor, and the first transistor comprises a first terminal electrically connected to a power supply terminal, and a second terminal electrically connected to a first terminal of the second transistor, and a second terminal of the second transistor is grounded, and the second regulator comprises an input terminal, and an output terminal serving as an output terminal of the voltage regulation system, and the voltage regulation control method comprises:

disabling the first regulator, and electrically connecting the input terminal of the second regulator to the power supply terminal;

setting a voltage on the second terminal of the first transistor to a ground voltage for a predetermined period;

setting the first transistor and the second transistor to the turn-off state;

activating the second regulator, and detecting the voltage on the second terminal of the first transistor;

determining that an inductor component is electrically connected between the second terminal of the first transistor and the input terminal of the second regulator, when the voltage on the second terminal of the first transistor is equal to a voltage on the power supply terminal; and determining that an open-circuit is formed between the second terminal of the first transistor and the input terminal of the second regulator, when the voltage on the second terminal of the first transistor is equal to the ground voltage.

2. The voltage regulation control method according to claim 1, wherein, after the step of determining that the open-circuit is formed between the second terminal of the first transistor and the input terminal of the second regulator, the voltage regulation control method further comprises:

disabling the first regulator and only enabling the second regulator for operation of the voltage regulation system.

3. The voltage regulation control method according to claim 1, wherein, after the step of determining that the inductor component is electrically connected between the second terminal of the first transistor and the input terminal of the second regulator, the voltage regulation control method further comprises:

enabling the first regulator and the second regulator for operation of the voltage regulation system, wherein the output voltage of the first regulator is provided to be the input voltage of the second regulator.

4. A voltage regulation system, comprising:

a first regulator comprising a first transistor and a second transistor, wherein the first transistor comprises a first terminal electrically connected to a power supply terminal, and a second terminal electrically connected to a first terminal of the second transistor, and a second terminal of the second transistor is grounded;

a second regulator comprising an input terminal, and an output terminal serving as an output terminal of the voltage regulation system;

a start-up and logic control circuit configured to disable the first regulator, in a detection mode, electrically connect the input terminal of the second regulator to the power supply terminal, and set a voltage on the second terminal of the first transistor to a ground voltage for a predetermined period, and wherein the start-up and logic control circuit then sets the first transistor and the second transistor to the turn-off state, and activates the second regulator, and detects the voltage on the second terminal of the first transistor; and a comparator configured to determine, according to the voltage on the second terminal of the first transistor, whether an inductor component is electrically connected between the second terminal of the first transistor and the input terminal of the second regulator.

5. The voltage regulation system according to claim 4, wherein when the comparator determines that no inductor component is electrically connected between the second terminal of the first transistor and the input terminal of the second regulator, the start-up and logic control circuit disables the first regulator and only enables the second regulator for operation of the voltage regulation system.

6. The voltage regulation system according to claim 4, wherein when the comparator determines that the inductor component is electrically connected between the second terminal of the first transistor and the input terminal of the second regulator, the start-up and logic control circuit enables the first regulator and the second regulator for operation of the voltage regulation system, wherein the output voltage of the first regulator is provided to be the input voltage of the second regulator.

7. The voltage regulation system according to claim 4, wherein the first regulator is a single inductor and multiple output (SIMO) regulator.

8. The voltage regulation system according to claim 4, comprising a plurality of the second regulators.

9. The voltage regulation system according to claim 8, further comprising a switch controller, a plurality of first switches, and a plurality of second switches, wherein the plurality of first switches are electrically connected between the input terminals of the plurality of second regulators and the output terminal of the first regulator, respectively;

wherein the plurality of second switches are electrically connected between the input terminals of the plurality of second regulators and the power supply terminal, respectively;

wherein the switch controller is configured to turn on or off the plurality of first switches and the plurality of second switches, respectively.

10. A regulator chip, comprising:

a first regulator comprising a first transistor, wherein the first transistor comprises a first terminal electrically connected to a power supply terminal, and a second terminal serving as an output terminal of the first regulator;

a second regulator comprising an input terminal and an output terminal, wherein the input terminal of the second regulator is electrically connected to the power supply terminal or to the output terminal of the first regulator through an external inductor component selectively, and the output terminal of the second regulator serves as a power output terminal of the regulator chip;

a start-up and logic control circuit, wherein the start-up and logic control circuit disables the first regulator in a detection mode, electrically connects the input terminal of the second regulator to the power supply terminal, and sets and maintains the voltage on the output terminal of the first regulator at a ground voltage for a predetermined period, and the start-up and logic control circuit then activates the second regulator; and a comparator configured to determine that an external inductor component is electrically connected between the second terminal of the first transistor and the input terminal of the second regulator when the comparator detects that the voltage on the output terminal of the first regulator is equal to the voltage of the power supply terminal, and in an operation mode, the start-up and logic control circuit uses the output voltage of the first regulator to provide the input voltage of the second regulator through the external inductor component;

wherein when the comparator detects that the voltage on the output terminal of the first regulator is not equal to the voltage on the power supply terminal, the comparator determines that an open-circuit is formed between the second terminal of the first transistor and the input terminal of the second regulator, and in the operation mode, the start-up and logic control circuit uses the output voltage of the power supply terminal to provide the input voltage of the second regulator.

* * * * *